US011532011B1

(12) United States Patent
Mauldin et al.

(10) Patent No.: US 11,532,011 B1
(45) Date of Patent: Dec. 20, 2022

(54) PROMOTION PROCESSING SYSTEM FOR IDENTIFYING STORE LOCATION FOR AN AISLE VIOLATOR SIGN AND RELATED METHODS

(71) Applicant: Inmar Clearing, Inc., Winston-Salem, NC (US)

(72) Inventors: Jennifer Mauldin, St. Petersburg, NC (US); William Thomas Borders, Jr., Winston-Salem, NC (US); Amy Callahan, Rogers, AR (US); Ryan Devoe, Northport, NY (US); Christopher J. Henry, Chicago, IL (US); James Hertel, Winnetka, IL (US); Sinem Hurst, Wellington, FL (US); Jordan Ivey, Waxhaw, NC (US); Andrew B. Jump, Lewisville, NC (US); Leah Logan, Bella Vista, AR (US); Blake Marts, Brooklyn, NY (US); Laura O'Steen, Nashville, TN (US); JP Petermann, Arlington Heights, IL (US); J. Brooke Smith, Baltimore, MD (US); Srujana Takkallapally, Irvine, CA (US); Irving Turner, Bentonville, AR (US); Tiffany Williams Khan, Hickory, NC (US); Andrew Wood, East Weymouth, MA (US); Robert Zomok, Advance, NC (US)

(73) Assignee: INMAR CLEARING, INC., Winston-Salem, NC (US)

( * ) Notice: Subject to any disclaimer, the term of this patent is extended or adjusted under 35 U.S.C. 154(b) by 0 days.

(21) Appl. No.: 17/091,698

(22) Filed: Nov. 6, 2020

(51) Int. Cl.
*G06Q 30/00* (2012.01)
*G06Q 30/02* (2012.01)
*G06Q 20/20* (2012.01)

(52) U.S. Cl.
CPC ....... *G06Q 30/0238* (2013.01); *G06Q 20/203* (2013.01); *G06Q 30/0223* (2013.01)

(58) Field of Classification Search
None
See application file for complete search history.

(56) References Cited

U.S. PATENT DOCUMENTS 10,435,279 B2 * 10/2019 Taylor .................... G05D 1/028
2006/0010027 A1 * 1/2006 Redman ........... G06Q 10/06375
705/7.16

(Continued)

*Primary Examiner* — Meredith A Long
(74) *Attorney, Agent, or Firm* — Allen, Dyer, Doppelt + Gilchrist, P.A.

(57) ABSTRACT

A promotion processing system may include a point-of-sale terminal at a store to collect purchased product identifiers from products being purchased, and a promotion generation server. The server may obtain the collected purchased product identifiers from the point-of-sale terminal, determine a store-transaction count based upon the collected purchased product identifiers, and for each purchased product identifier, map the corresponding product to an aisle location within the store. The server may determine a corresponding aisle-transaction count for the aisle location corresponding to each product based upon the mapped aisle locations, and determine shopper paths of travel within the store based upon the store- and aisle-transaction counts. The server may identify a location within the store for an aisle violator sign for a promoted product located in one of the aisle locations based upon the shopper paths of travel and the aisle-transaction counts, and generate a digital promotion for the promoted product.

19 Claims, 8 Drawing Sheets

(56) References Cited

U.S. PATENT DOCUMENTS

| | | | |
|---|---|---|---|
| 2006/0095324 A1* | 5/2006 | Vergeyle | G06Q 30/0238 705/14.38 |
| 2007/0067220 A1* | 3/2007 | Godsey | G06Q 30/0237 705/23 |
| 2010/0185487 A1* | 7/2010 | Borger | G06Q 30/0201 705/7.29 |
| 2015/0112790 A1 | 4/2015 | Wolinsky et al. | |
| 2015/0379550 A1* | 12/2015 | Warner | G06Q 30/0238 705/14.33 |
| 2016/0253740 A1* | 9/2016 | Goulart | G06Q 90/20 705/26.8 |
| 2017/0323281 A1* | 11/2017 | Jones | G06Q 20/203 |
| 2018/0322514 A1* | 11/2018 | Sargent | G07G 3/00 |
| 2019/0205933 A1 | 7/2019 | Glaser et al. | |
| 2020/0104863 A1* | 4/2020 | Gupta | G06Q 30/0201 |

\* cited by examiner

PROMOTION PROCESSING SYSTEM FOR IDENTIFYING STORE LOCATION FOR AN AISLE VIOLATOR SIGN AND RELATED METHODS

TECHNICAL FIELD

The present invention relates to the field of electronics, and more particularly, to promotion processing and related methods.

BACKGROUND

Sales of a particular product or service may be based upon how well that product or service is marketed to a consumer. One form of marketing is a coupon, typically in paper form, for a discount toward the product or service. Some coupons may be retailer-specific, for example, only redeemable for the discount at a particular retailer, while other coupons may be product-specific from a manufacturer and redeemable at any retailer.

A coupon, while typically in paper form, may be in digital form and may be referred to as a digital promotion. A digital promotion may be selected or "clipped" via a mobile phone and saved to a digital wallet for redemption at a point-of-sale (POS) terminal, for example. A typical coupon is applicable to a given product and has a redeemable value that may vary based upon the quantity of a given item, for example, brand of item, size of the product in terms of packaging, and/or the price point of the given item. A typical coupon may also be redeemable only at a given retailer and/or within a threshold time period.

Another form of marketing is signage. Signage or a physical advertisement, typically visually identifies a product or service for purchase with either or both of text or graphics, for example, logos. Signage may take on different forms, for example, storefront signs, billboards, flyers, etc. Some signs may be located within a store or retail location to identify products or services. One type of in-store signage is an aisle violator, for example. An aisle violator, for example, couples to a shelf within the store and extends a relatively small distance into an aisle within the store. The aisle violator includes graphics and/or text associated with a product for purchase.

SUMMARY

A promotion processing system may include a point-of-sale (POS) terminal at a store and configured to collect purchased product identifiers from products being purchased at the store, and a promotion generation server. The promotion generation server may be configured to obtain the collected purchased product identifiers from the POS terminal, determine a store-transaction count based upon the collected purchased product identifiers, and for each purchased product identifier, map the corresponding product to an aisle location within the store. The promotion generation server may also be configured to determine a corresponding aisle-transaction count for the aisle location corresponding to each product based upon the mapped aisle locations, and determine shopper paths of travel within the store based upon the store-transaction count and the aisle-transaction counts. The promotion generation server may further be configured to identify at least one location within the store for an aisle violator sign for a promoted product located in one of the aisle locations based upon the shopper paths of travel and the aisle-transaction counts, and generate a digital promotion for the promoted product.

The promotion generation server may be configured to identify the at least one location for the aisle violator sign to correspond to the aisle location having a greater aisle-transaction count from among the aisle locations for a given shopper path of travel, for example. The promotion generation server may be configured to determine the promoted product based upon the promoted product being in an aisle location having a lower aisle-transaction count from among the aisle locations for a given shopper path of travel.

The at least one location for the aisle violator sign may be in a same aisle location as the promoted product, for example. The at least one location for the aisle violator sign may be along a same shopper path of travel as the promoted product, for example.

Each product may have a product category associated therewith. The promotion generation server may be configured to, for each purchased product identifier, logically map the corresponding product to an aisle location within the store based upon the product category. The promotion generation server may be configured to update the at least one location for the aisle violator sign based upon redemption of the digital promotion for the promoted product at the POS terminal, for example.

The promotion generation server may be configured to generate text and at least one image for the aisle violator sign. The at least one image may include a machine-readable image, for example.

The promotion generation server may be configured to operate a messenger bot for communicating with a mobile wireless communications device of a given shopper based upon the machine-readable image, for example. The promotion generation server may be configured to operate a messenger bot and communicate the digital promotion via the messenger bot.

A method aspect is directed to a method of generating a promotion. The method may include using a promotion generation server to obtain purchased product identifiers collected from a point-of-sale (POS) terminal at a store from products being purchased at the store, and determine a store-transaction count based upon the collected purchased product identifiers. The method may also include using the promotion generation server to, for each purchased product identifier, map the corresponding product to an aisle location within the store, and determine a corresponding aisle-transaction count for the aisle location corresponding to each product based upon the mapped aisle locations. The method may also include using the promotion generation server to determine shopper paths of travel within the store based upon the store-transaction count and the aisle-transaction counts, identify at least one location within the store for an aisle violator sign for a promoted product located in one of the aisle locations based upon the shopper paths of travel and the aisle-transaction counts, and generate a digital promotion for the promoted product.

A computer readable medium aspect is directed to a non-transitory computer readable medium for generating a promotion. The non-transitory computer readable medium includes computer executable instructions that when executed by a processor of a promotion generation server, cause the processor to perform operations. The operations may include obtaining purchased product identifiers collected from a point-of-sale (POS) terminal at a store from products being purchased at the store, and determining a store-transaction count based upon the collected purchased product identifiers. The operations may include for each purchased product identifier, mapping the corresponding product to an aisle location within the store, and determining a corresponding aisle-transaction count for the aisle location corresponding to each product based upon the mapped aisle locations. The operations may also include determining shopper paths of travel within the store based upon the store-transaction count and the aisle-transaction counts, and identifying at least one location within the store for an aisle violator sign for a promoted product located in one of the aisle locations based upon the shopper paths of travel and the aisle-transaction counts, and generating a digital promotion for the promoted product.

DETAILED DESCRIPTION

Figure 1:
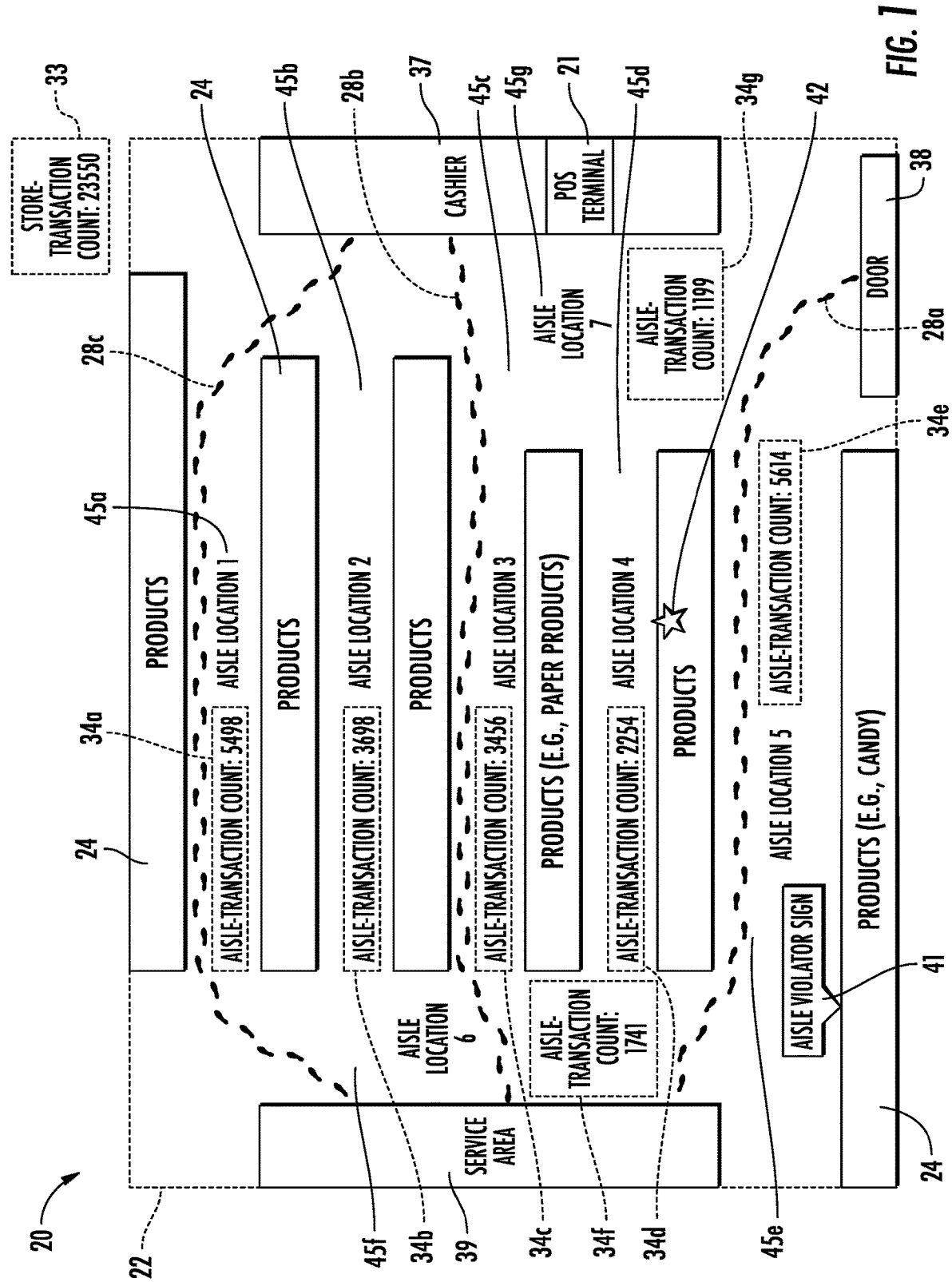
FIG. 1 is a schematic diagram of a store layout illustrating operation of a promotion processing system according to an embodiment.
Figure 2:
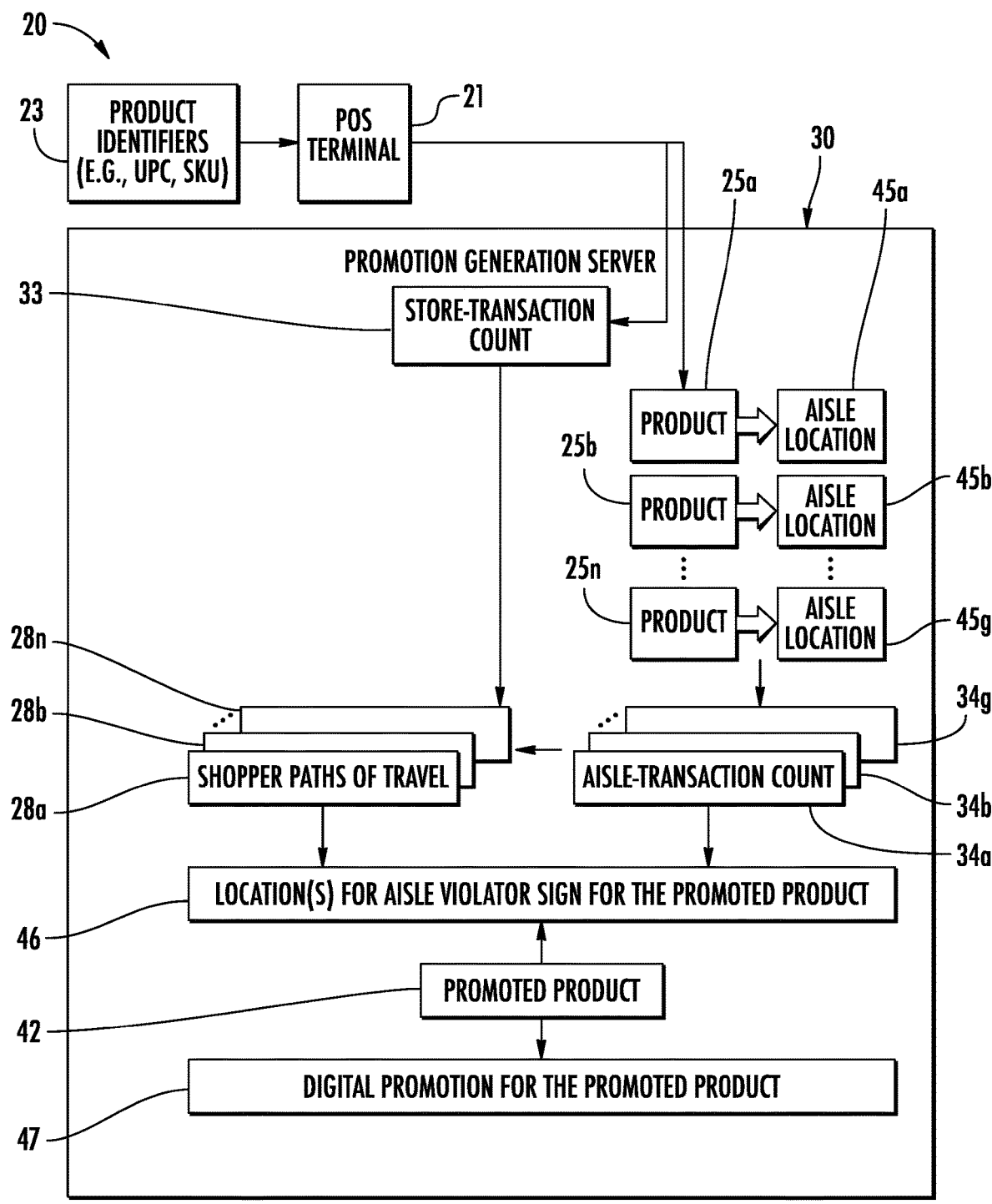
FIG. 2 is a schematic diagram of the promotion processing system of FIG. 1.
Figure 3:
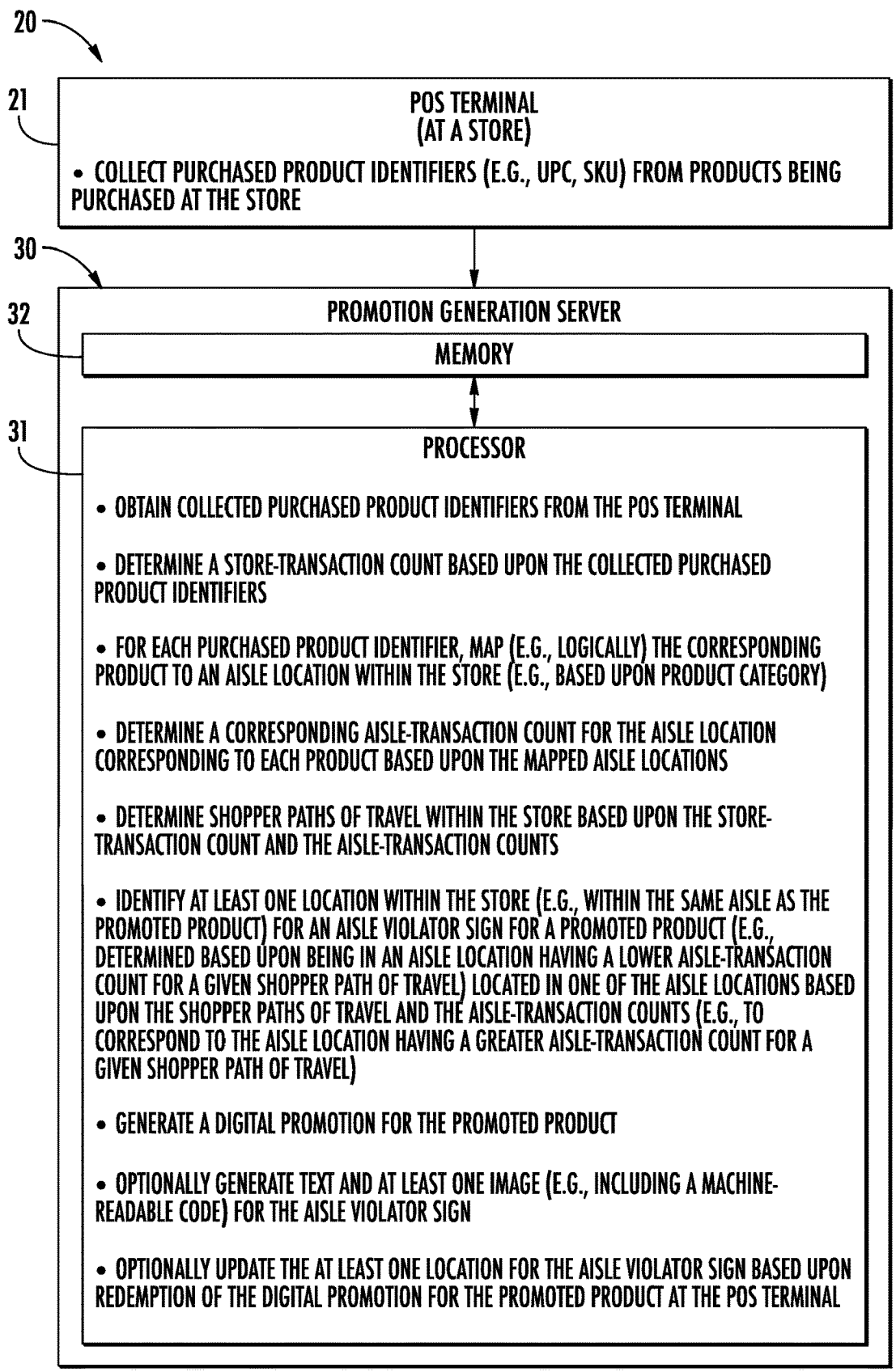
FIG. 3 is a schematic block diagram of the promotion processing system of FIG. 1.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Referring initially to FIGS. 1-4, a promotion processing system 20 illustratively includes a point-of-sale (POS) terminal 21 at a store 22. The POS terminal 21 collects purchased product identifiers 23 from products 24 being purchased at the store 22.

The promotion processing system 20 also includes a promotion generation server 30. The promotion generation server 30 includes a processor 31 and an associated memory 32. While operations of the promotion generation server 30 are described herein, the operations are performed based upon cooperation between the processor 31 and the associated memory 32.

Figure 6:
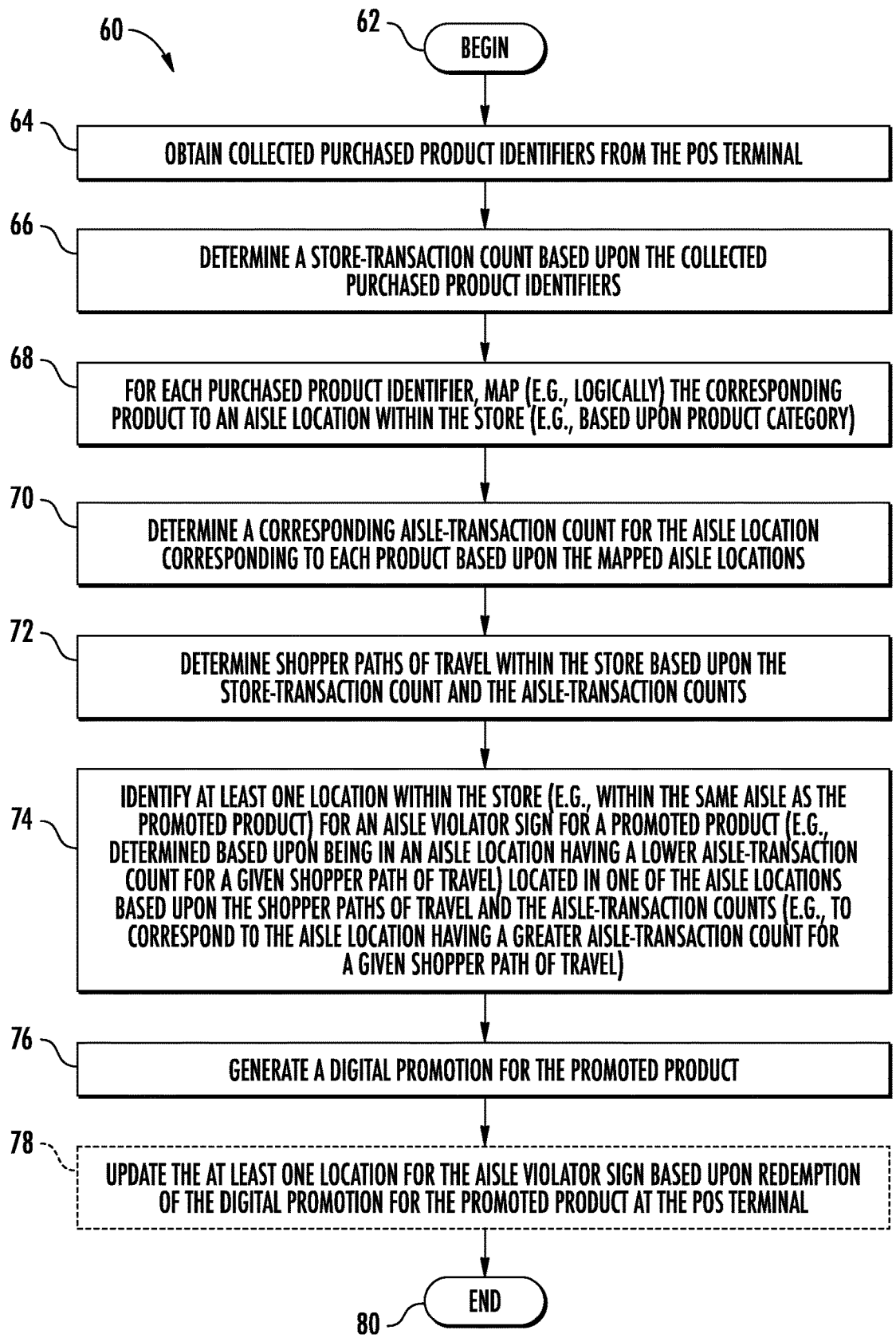
FIG. 6 is flow diagram illustrating operations of the promotion generation server in accordance with an embodiment.

Referring now to the flowchart 60 in FIG. 6, beginning at Block 62, operations of the promotion generation server 30 will now be described. At Block 64, the promotion generation server 30 obtains the collected purchased product identifiers from the POS 21 terminal. The purchased product identifiers may include a barcode or other machine readable identifier that may be representative of a stock keeping unit (SKU), uniform product code (UPC), or other code. The POS terminal 21, for example, may optically acquire the machine readable purchased product identifier, and communicate the purchased product identifier to the promotion generation server 30. In an embodiment, the POS terminal 21 may acquire an image of each purchased product, and the promotion generation server 30 may use optical character recognition to identify, extract, or obtain the purchase product identifier.

The promotion generation server 30, at Block 66, determines a store-transaction count 33 based upon the collected purchased product identifiers 23. The store-transaction count 33 may be indicative of how many items are purchased over a given time period at the store 22. The store-transaction count 33 may alternatively be indicative of how many customers (either unique or repeat) have purchased items. The promotion generation server 30 may also determine an average number of products 24 being purchased per customer, for example.

At Block 68, for each purchased product identifier 23, the promotion generation server 30 maps the corresponding product 25a-25n to an aisle location 45a-45g within the store 22. More particularly, the store 22 has a layout associated therewith that identifies aisle locations, cahier locations, doors, etc., and where particular purchased products are relative to the map or the location within the store. The promotion generation server 30 may generate a visual representation of the store or a map thereof with indicators thereon representing purchased product locations with respect to the aisle locations 45a-45g for sending to a remote device. While seven aisle locations have been described herein, it will be appreciated by those skilled in the art that there may be any number of aisle locations.

The promotion generation server 30 determines a corresponding aisle-transaction count 34a-34g for the aisle location 45a-45g corresponding to each product 25a-25n based upon the mapped aisle locations (Block 70). More particularly, the promotion generation server 30 determines a count of purchased products per aisle. In other words, the aisle-transaction counts 34a-34g identify which aisle locations 45a-45g are seeing more or less relative foot traffic based upon the amount of products 25a-25n being purchased on each aisle location. In some embodiments, the promotion generation server 30 may, for each product identifier 23, logically map the corresponding product 25a-25n to an aisle location 45a-45g within the store based upon a product category associated with each product. For example, the promotion generation server 30 may group products for purchase 24 (e.g., paper products, medications, toys, etc.) based upon the product identifiers 23, and map the corresponding products 25a-25n to an aisle location 45a-45g within the store 22 based upon to which product category a given product belongs.

The promotion generation server 30, at Block 72, determines shopper paths of travel 28a-28n within the store based upon the store-transaction count 33 and the aisle-transaction counts 34a-34g. The promotion generation server 30 is thus able to determine which products are being purchased from which aisle, for example, in terms of total purchases for the store 22. The promotion generation server 30 may apply machine learning, for example, with respect to the location of checkouts or cashiers 37, doors 38, and service areas, such as, for example, a pharmacy counter 39, to determine paths of travel 28a-28n shoppers take. For example, if a pharmacy counter 39 is in a rear of the store 22 opposite the entrance 38, relatively more shoppers may walk down the aisle location 45e with candy as compared to the aisle location 45d with paper products on their way from the entrance (FIG. 1).

Figure 5:
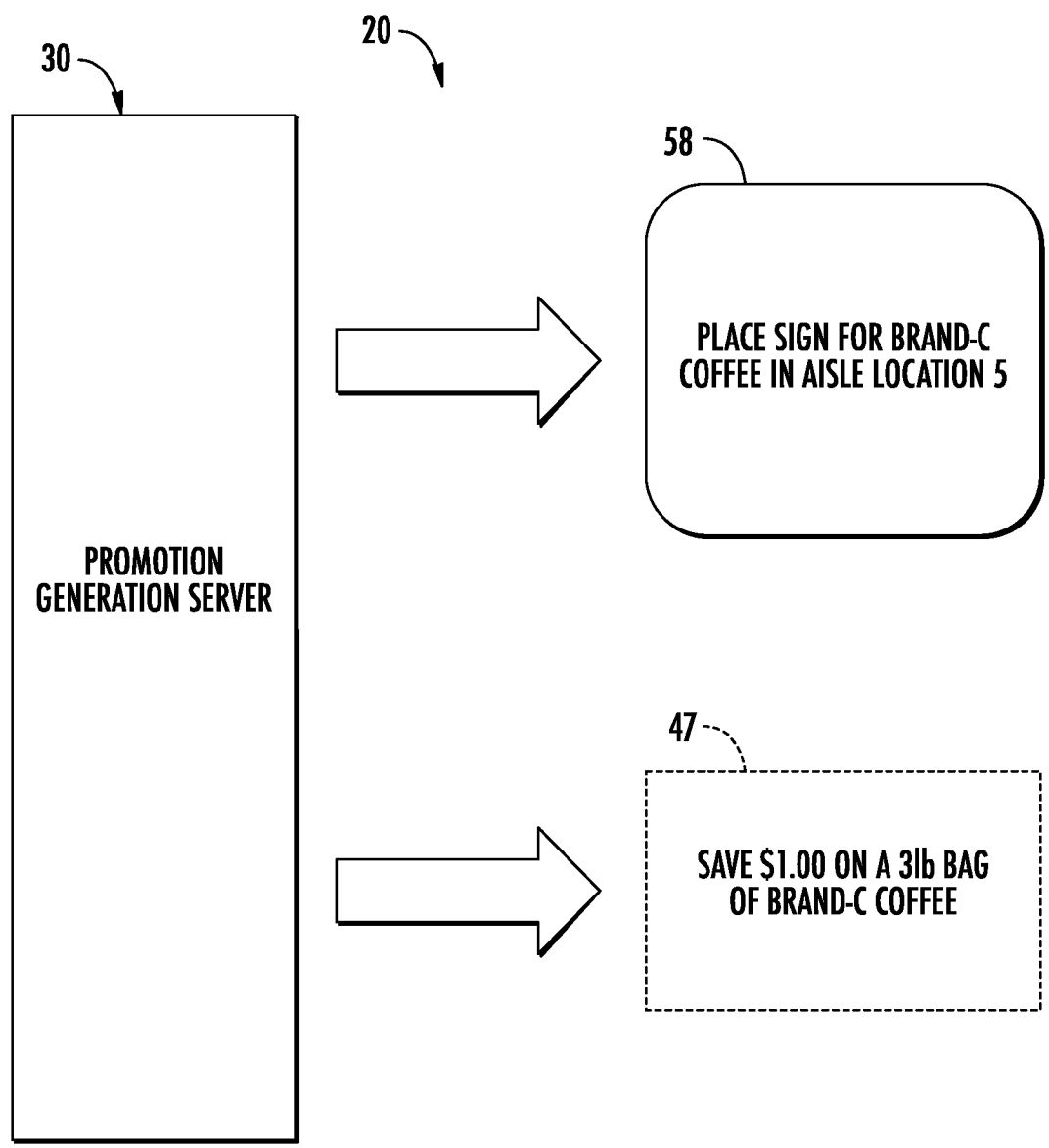
FIG. 5 is schematic diagram illustrating operations of the promotion generation server in accordance with an embodiment.

The promotion generation server 30 identifies one or more locations 46 within the store 22 for an aisle violator sign 41 for a promoted product 42 located in one of the aisle locations 45a-45g based upon the shopper paths of travel 28a-28n and the aisle-transaction counts 34a-34g (Block 74). More particularly, the promotion generation server 30 may determine the location 46 within the store 22 for the aisle violator sign 40 to correspond to an aisle location 45e having a greatest aisle-transaction count 34e among the aisle locations along a given shopper path of travel 28a. In other words, if, based upon the determined shopper paths of travel 28a-28n and the amount of products purchased in any given aisle location 45a-45g, it may be determined that a given aisle location sees more shopper foot traffic than other aisle locations, and as a result it may be desirable to place an aisle violator sign 41 in that given aisle location for increased exposure. The location or locations identified by the promotion generation server 30 may be communicated to a remote device 58 for display thereon, for example (FIG. 5).

In an embodiment, the promotion generation server 30 may identify aisle locations 45a-45g having more than a threshold amount of shopper traffic based upon the corresponding aisle-transaction counts 34a-34g. Thus, the promotion generation server 30 may identify multiple locations within the store for aisle violator signs 41 for a promoted product 42. For aisle locations 45a-45g having less than a desired aisle-transaction count 34a-34g or not being along more frequently traveled shopper paths of travel, the promotion generation server 30 may identify the promoted product 42 from those aisle locations. For example, a given shopper path of travel may include multiple aisle locations 45a-45g including an aisle location with a higher aisle-transaction count, and an aisle location with a lower aisle-transaction count. In this case, the promotion generation server 30 may determine the location of the aisle violator sign 41 to be in a different aisle location 45a-45g as the promoted product 42, but along the same shopper path of travel 28a-28n. This may occur particularly when there are multiple identified shopper paths of travel 28a-28n sharing a single common aisle location 45a-45g.

Figure 7:
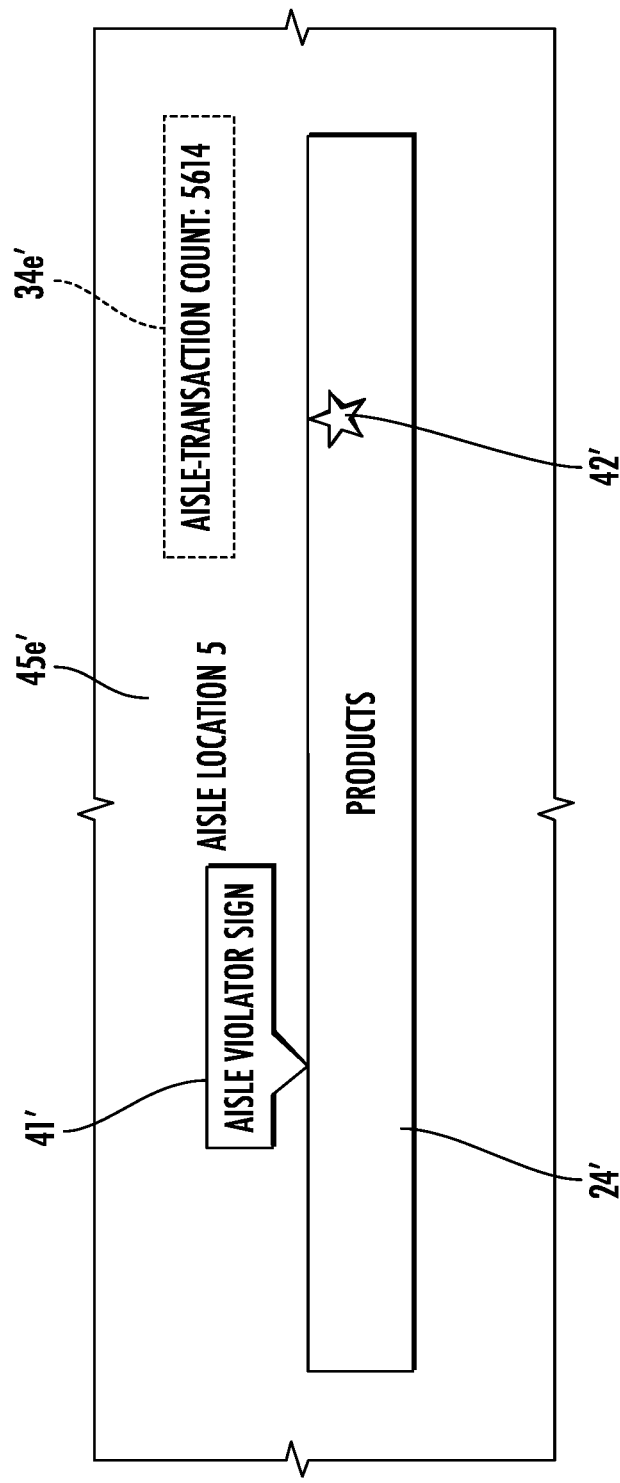
FIG. 7 is a schematic diagram of a partial store layout illustrating operation of a promotion processing system according to another embodiment.

Referring now briefly to FIG. 7, in another embodiment, the promoted product 42' may be located in a same aisle location 45e' as the aisle violator sign 41'. The promotion generation server may thus determine that in this case, while the aisle-transaction count 34e' for a given aisle location is relatively higher than other aisle locations, a given product from among products for purchase 24' on the given aisle location has relatively low sales (e.g., based upon the store-transaction count). Accordingly, the promoted product 42' may be in the same aisle location as the aisle violator sign 41', albeit at different locations within the same aisle location 45e'.

Referring again to FIGS. 1-6, the promoted product 42 may be determined by the promotion generation server 30 based upon the promoted product being in an aisle location 45a-45g having a lower aisle-transaction count 34a-34g from among the aisle locations for a given shopper path of travel 28a-28n. For example, a given aisle location 45a-45g may have less foot traffic than other aisle locations as determined according to the shopper paths of travel 28a-28n. That is, with reference to the pharmacy exemplary store layout described above whereby the pharmacy counter 39 is in the rear of the store 22 opposite the entrance 38 (FIG. 1), and relatively more shoppers may walk down the aisle location with candy as compared to the aisle location with paper products on their way from the entrance, the promoted product 42 may be located on the paper product aisle location 45a or the promoted product may be a paper product.

Figure 4:
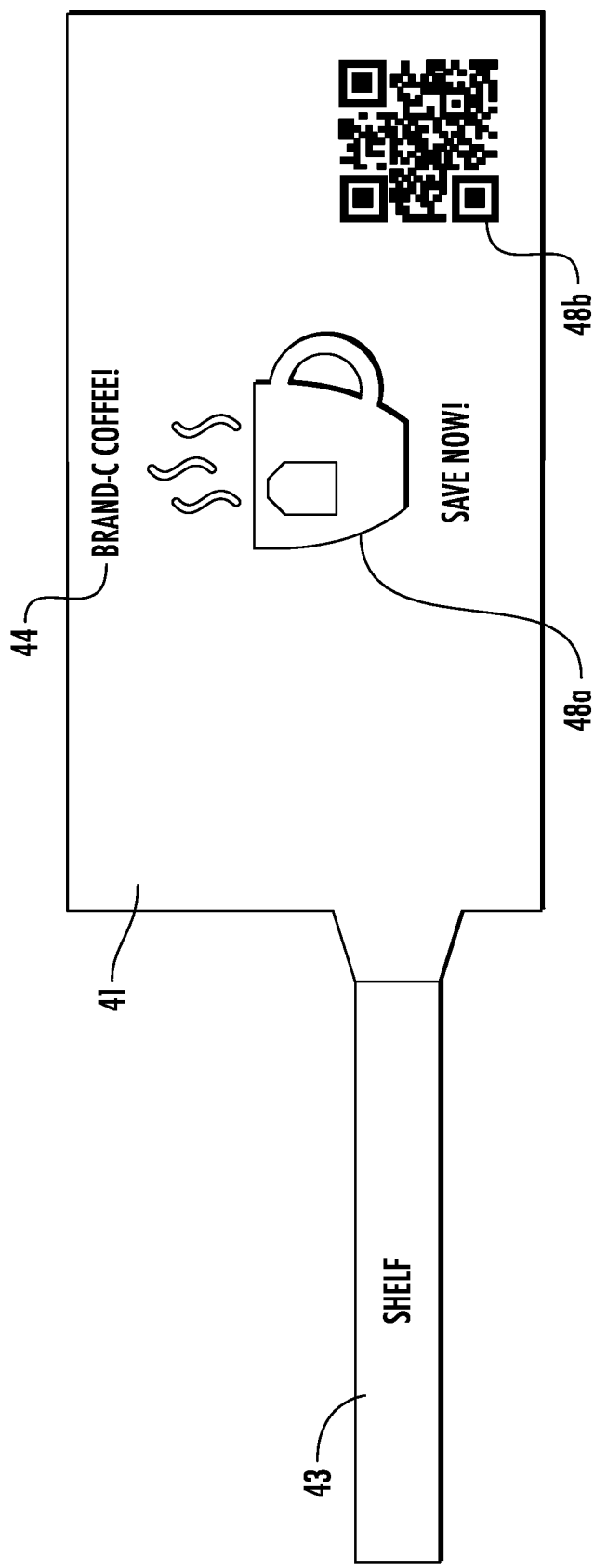
FIG. 4 is a schematic diagram of an aisle violator sign generated by the promotion generation server in accordance with an embodiment.

As will be appreciated by those skilled in the art, an aisle violator sign 41 or blade sign, is a form of signage, particularly in a retail location. This signage 41, which is generally used for promotion of a product (i.e., the promoted product 42), typically mounts to a shelf 43 upright and juts out perpendicular from the aisle shelf into the aisle location, thus directing a shopper's attention as they approach. An aisle violator sign 41 may include printed text 44 and/or images 48a, 48b on one or both sides of the signs, which permits shoppers to view the aisle violation sign no matter the direction of approach (FIG. 4).

In some embodiments, the promotion generation server 30 may optionally generate the text 44 and an image or images 48a, 48b for the aisle violator sign 41. More particularly, the promotion generation server 30 may access a database of text and graphics for a given promoted product and generate the text and image based thereon. More particularly, the promotion generation server 30 may adjust sizes, colors, fonts, verbiage, etc. to achieve desired interest in the promoted product 42, which may be measured by redemption rates of an associated digital promotion 47. In an embodiment, the promotion generation server 30 may use machine learning to learn which combinations of text 44 and images 48a, 48b, as will be described in further detail below, including size, color, fonts, and verbiage, achieve a desired interest in the promoted product 42, for example, as determined by redemption of an associated digital promotion 47, aisle-transaction counts 34a-34g, and store-transaction counts 33 (e.g., increased sales of the promoted item as determined by the product identifier).

The promotion generation server 30 may also generate an image as a machine-readable image 48b, for example, QR code, that may be scanned by a mobile wireless communications device of a given shopper. The machine-readable image 48b may cooperate with the mobile wireless communications device to open an application or browser directed to a website associated with the promoted product 42.

At Block 76, the promotion generation server 30 generates a digital promotion 47 for the promoted product 42. The digital promotion 47 may be a digital coupon, for example, redeemable toward the purchase of the promoted product 42 at the store 22. In embodiments where a machine-readable code image 48b is printed on the aisle violator sign 41, scanning of the machine-readable code image may cause the mobile wireless communications device to display the digital promotion 47 thereon, for example, for redemption at the POS terminal 21 or for saving to a digital wallet associated with the given shopper.

At Block 78, the promotion generation server 30 may update the one or more locations for the aisle violator sign 41 based upon redemption of the digital promotion 47 for the promoted product 42 at the POS terminal 21. For example, if the digital promotion is effective based upon a redemption rate such that purchases of the promoted product have increased (e.g., to a desired or threshold level), the increase may be attributed to the aisle violator sign 41, and the promotion generation server 30 may update the location to change the location of the aisle violator sign, for example, to an aisle-location having a lower amount of traffic. This may permit other promoted products to have higher visibility. Of course, if the redemption rate for a given promoted product is too high or beyond a desirable level (e.g., such that promotion has a cost beyond budgeted), the promotion server 30 may also update the location of the aisle violator sign 41. Alternatively, if the digital promotion redemption rate is lower than desired or a threshold, the promotion generation server 30 may update the location for the aisle violator sign 41. Updated, for example, shopper paths of travel 28*a*-28*n* and aisle-transaction counts 34*a*-34*g* may be also be used as a basis for updating the location of the aisle violator sign. Operations end at Block 80.

Figure 8:
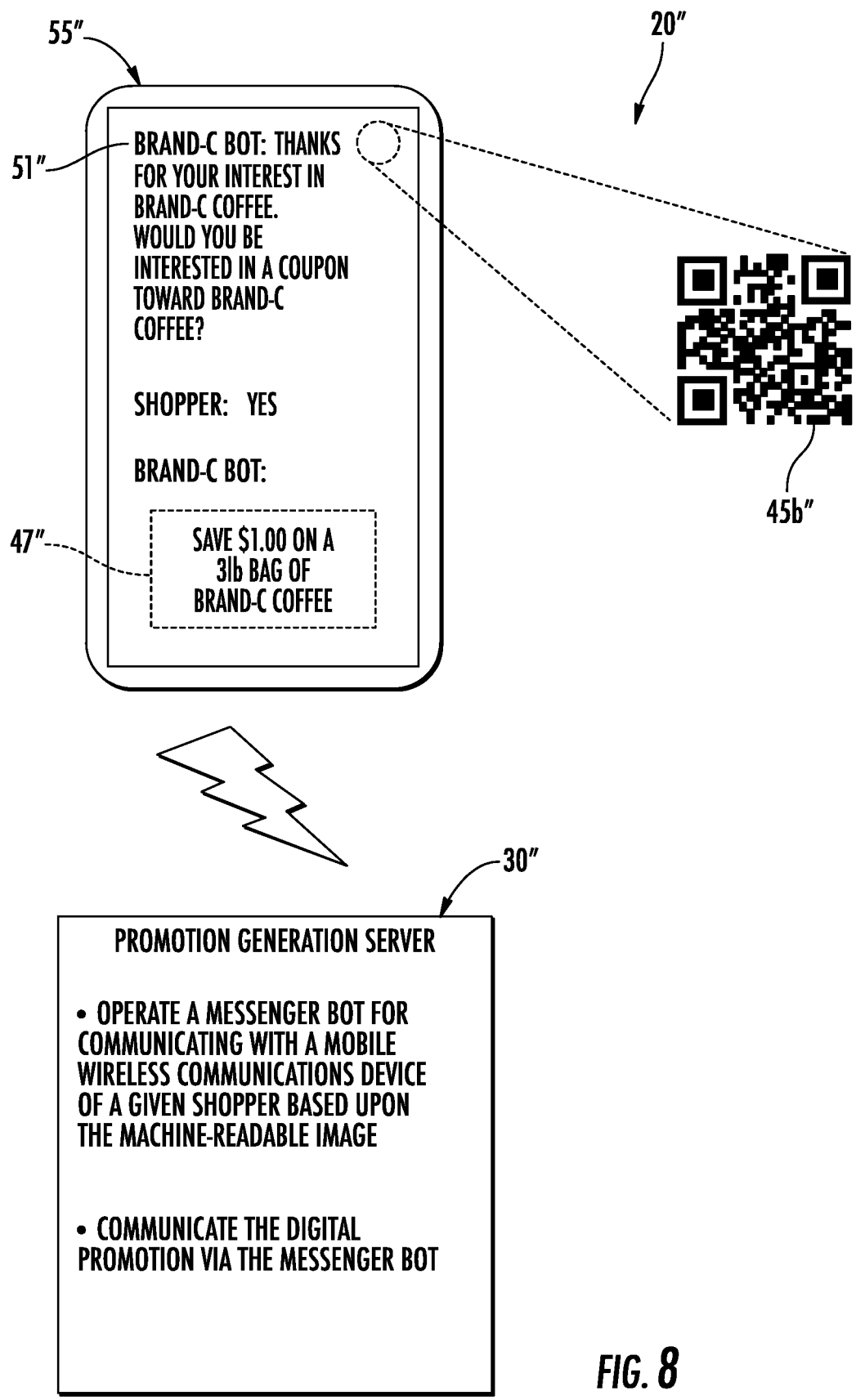
FIG. 8 is a schematic diagram of a portion of a promotion processing system in accordance with another embodiment.

Referring now to FIG. 8, in another embodiment, the promotion generation server 30" operates a messenger bot 51". The messenger bot 51" may be implemented in the form of a two-way dialog box that permits the given user to communicate by way of typing (i.e., written communication). In some embodiments, the messenger bot 51" may operate through voice commands or spoken words. The messenger bot 51" may operate based upon artificial intelligence (AI) such that is can respond to input as if the two-way dialog were between two humans instead of between a human and a machine.

Upon scanning of the machine-readable image 48*b*" described above, the promotion generation server 30" operates the messenger bot 51" on a mobile wireless communications device 55" associated with a given shopper to communicate with the given shopper via the messenger bot on the mobile wireless communications device. In other words, scanning of the machine-readable image 48*b*" by the mobile wireless communications device 55" opens a dialog of the messenger bot 51" on the mobile wireless communications device. The promotion generation server 30" generates the digital promotion 47" and communicates the digital promotion via the messenger bot 51" (i.e., within the messenger bot dialog or conversation). Of course, in some embodiments, the promotion generation server 30" may communicate the digital promotion 47" via the messenger bot 51" independently from scanning of the machine-readable image 48*b*".

A method aspect is directed to a method of generating a promotion 47. The method may include using a promotion generation server 30 to obtain purchased product identifiers 23 collected from a point-of-sale (POS) terminal 21 at a store 22 from products being purchased at the store 25*a*-25*n*, and determine a store-transaction count 33 based upon the collected purchased product identifiers. The method may also include using the promotion generation server 30 to, for each purchased product identifier 23, map the corresponding product 25*a*-25*n* to an aisle location 45*a*-45*g* within the store 22, and determine a corresponding aisle-transaction count 34*a*-34*g* for the aisle location corresponding to each product based upon the mapped aisle locations. The method may also include using the promotion generation server 30 to determine shopper paths of travel 28*a*-28*n* within the store 22 based upon the store-transaction count 33 and the aisle-transaction counts 34*a*-34*g*, identify at least one location 46 within the store for an aisle violator sign 41 for a promoted product 42 located in one of the aisle locations 45*a*-45*g* based upon the shopper paths of travel and the aisle-transaction counts, and generate a digital promotion 47 for the promoted product.

A computer readable medium aspect is directed to a non-transitory computer readable medium for generating a promotion. The non-transitory computer readable medium includes computer executable instructions that when executed by a processor 31 of a promotion generation server 30, cause the processor to perform operations. The operations may include obtaining purchased product identifiers 23 collected from a point-of-sale (POS) terminal 21 at a store 22 from products 25*a*-25*n* being purchased at the store, and determining a store-transaction count 33 based upon the collected purchased product identifiers. The operations may include for each purchased product identifier 23, mapping the corresponding product to an aisle location 45*a*-45*g* within the store 22, and determining a corresponding aisle-transaction count 34*a*-34*g* for the aisle location corresponding to each product 25*a*-25*n* based upon the mapped aisle locations. The operations may also include determining shopper paths of travel 28*a*-28*n* within the store 22 based upon the store-transaction count 33 and the aisle-transaction counts 34*a*-34*g*, and identifying at least one location 46 within the store for an aisle violator sign 41 for a promoted product 42 located in one of the aisle locations based upon the shopper paths of travel and the aisle-transaction counts, and generating a digital promotion 47 for the promoted product.

While several embodiments have been described herein, it should be appreciated by those skilled in the art that any element or elements from one or more embodiments may be used with any other element or elements from any other embodiment or embodiments. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A promotion processing system comprising:
   a mobile wireless communications device associated with a given shopper;
   a point-of-sale (POS) terminal at a store and configured to collect purchased product identifiers from products being purchased at the store; and
   a promotion generation server configured to
      obtain the collected purchased product identifiers from said POS terminal,
      determine a store-transaction count based upon the collected purchased product identifiers,
      for each purchased product identifier, map the corresponding product to an aisle location within the store,
      determine a corresponding aisle-transaction count for the aisle location corresponding to each product based upon the mapped aisle locations,
      determine shopper paths of travel within the store based upon the store-transaction count and the aisle-transaction counts,
      identify at least one location within the store for an aisle violator sign for a promoted product located in one of the aisle locations based upon the shopper paths of travel and the aisle-transaction counts, the aisle violator sign comprising text and at least one machine-readable image,
      generate a digital promotion for the promoted product,
      cooperate with the mobile wireless communications device to operate a messenger bot implemented in the form of a two-way dialog and based upon the machine-readable image, and communicate the digital promotion to the given user via the messenger bot within the two-way dialog, the messenger bot being operated based upon artificial intelligence (AI) such that the messenger bot responds to input as if the two-way dialog were between two humans instead of a human and a machine, cooperate with the POS terminal to track redemption of the digital promotion, and use machine learning to learn combinations of text and machine-readable images that increase interest in the promoted product by accepting, as input to a machine learning algorithm, the tracked redemption, the aisle-transaction counts, the store transaction count, and the text and at least one machine-readable image of the aisle violator sign, and updating, as output from the machine learning algorithm, the text and the at least one machine-readable image.

2. The promotion processing system of claim 1 wherein said promotion generation server is configured to identify the at least one location for the aisle violator sign to correspond to the aisle location having a greater aisle-transaction count from among the aisle locations for a given shopper path of travel.

3. The promotion processing system of claim 1 wherein said promotion generation server is configured to determine the promoted product based upon the promoted product being in an aisle location having a lower aisle-transaction count from among the aisle locations for a given shopper path of travel.

4. The promotion processing system of claim 1 wherein the at least one location for the aisle violator sign is in a same aisle location as the promoted product.

5. The promotion processing system of claim 1 wherein the at least one location for the aisle violator sign is along a same shopper path of travel as the promoted product.

6. The promotion processing system of claim 1 wherein each product has a product category associated therewith; and wherein said promotion generation server is configured to, for each purchased product identifier, logically map the corresponding product to an aisle location within the store based upon the product category.

7. The promotion processing system of claim 1 wherein said promotion generation server is configured to update the at least one location for the aisle violator sign based upon the tracked redemption of the digital promotion for the promoted product at said POS terminal.

8. A promotion generation server comprising:

a processor and an associated memory configured to obtain purchased product identifiers collected from a point-of-sale (POS) terminal at a store from products being purchased at the store, determine a store-transaction count based upon the collected purchased product identifiers, for each purchased product identifier, map the corresponding product to an aisle location within the store, determine a corresponding aisle-transaction count for the aisle location corresponding to each product based upon the mapped aisle locations, determine shopper paths of travel within the store based upon the store-transaction count and the aisle-transaction counts, identify at least one location within the store for an aisle violator sign for a promoted product located in one of the aisle locations based upon the shopper paths of travel and the aisle-transaction counts, the aisle violator sign comprising text and at least one machine-readable image, generate a digital promotion for the promoted product, cooperate with a mobile wireless communications device associated with a given user to operate a messenger bot implemented in the form of a two-way dialog and based upon the machine-readable image, and communicate the digital promotion to the given user via the messenger bot within the two-way dialog, the messenger bot being operated based upon artificial intelligence (AI) such that the messenger bot responds to input as if the two-way dialog were between two humans instead of a human and a machine, cooperate with the POS terminal to track redemption of the digital promotion, and use machine learning to learn combinations of text and machine-readable images that increase interest in the promoted product by accepting, as input to a machine learning algorithm, the tracked redemption, the aisle-transaction counts, the store transaction count, and the text and at least one machine-readable image of the aisle violator sign, and updating, as output from the machine learning algorithm, the text and the at least one machine-readable image.

9. The promotion generation server of claim 8 wherein said processor is configured to identify the at least one location for the aisle violator sign to correspond to the aisle location having a greater aisle-transaction count from among the aisle locations for a given shopper path of travel.

10. The promotion generation server of claim 8 wherein said processor is configured to determine the promoted product based upon the promoted product being in an aisle location having a lower aisle-transaction count from among the aisle locations for a given shopper path of travel.

11. The promotion generation server of claim 8 wherein said processor is configured to update the at least one location for the aisle violator sign based upon the tracked redemption of the digital promotion for the promoted product at said POS terminal.

12. A method of generating a promotion comprising:

using a promotion generation server to obtain purchased product identifiers collected from a point-of-sale (POS) terminal at a store from products being purchased at the store, determine a store-transaction count based upon the collected purchased product identifiers, for each purchased product identifier, map the corresponding product to an aisle location within the store, determine a corresponding aisle-transaction count for the aisle location corresponding to each product based upon the mapped aisle locations, determine shopper paths of travel within the store based upon the store-transaction count and the aisle-transaction counts, identify at least one location within the store for an aisle violator sign for a promoted product located in one of the aisle locations based upon the shopper paths of travel and the aisle-transaction counts, the aisle violator sign comprising text and at least one machine-readable image, generate a digital promotion for the promoted product, cooperate with a mobile wireless communications device associated with a given user to operate a messenger bot implemented in the form of a two-way dialog and based upon the machine-readable image, and communicate the digital promotion to the given user via the messenger bot within the two-way dialog, the messenger bot being operated based upon artificial intelligence (AI) such that the messenger bot responds to input as if the two-way dialog were between two humans instead of a human and a machine, cooperate with the POS terminal to track redemption of the digital promotion, and use machine learning to learn combinations of text and machine-readable images that increase interest in the promoted product by accepting, as input to a machine learning algorithm, the tracked redemption, the aisle-transaction counts, the store transaction count, and the text and at least one machine-readable image of the aisle violator sign, and updating, as output from the machine learning algorithm, the text and the at least one machine-readable image.

13. The method of claim 12 wherein using the promotion generation server comprises using the promotion generation server to identify the at least one location for the aisle violator sign to correspond to the aisle location having a greater aisle-transaction count from among the aisle locations for a given shopper path of travel.

14. The method of claim 12 wherein using the promotion generation server comprises using the promotion generation server to determine the promoted product based upon the promoted product being in an aisle location having a lower aisle-transaction count from among the aisle locations for a given shopper path of travel.

15. The method of claim 12 wherein using the promotion generation server comprises using the promotion generation server to update the at least one location for the aisle violator sign based upon the tracked redemption of the digital promotion for the promoted product at the POS terminal.

16. A non-transitory computer readable medium for generating a promotion, the non-transitory computer readable medium comprising computer executable instructions that when executed by a processor of a promotion generation server, cause the processor to perform operations comprising:

obtaining purchased product identifiers collected from a point-of-sale (POS) terminal at a store from products being purchased at the store;

determining a store-transaction count based upon the collected purchased product identifiers;

for each purchased product identifier, mapping the corresponding product to an aisle location within the store;

determining a corresponding aisle-transaction count for the aisle location corresponding to each product based upon the mapped aisle locations;

determining shopper paths of travel within the store based upon the store-transaction count and the aisle-transaction counts;

identifying at least one location within the store for an aisle violator sign for a promoted product located in one of the aisle locations based upon the shopper paths of travel and the aisle-transaction counts, the aisle violator sign comprising text and at least one machine-readable image;

generating a digital promotion for the promoted product;

cooperating with a mobile wireless communications device to operate a messenger bot implemented in the form of a two-way dialog and based upon the machine-readable image, and communicate the digital promotion via the messenger bot within the two-way dialog, the messenger bot being operated based upon artificial intelligence (AI) such that the messenger bot responds to input as if the two-way dialog were between two humans instead of a human and a machine;

cooperating with the POS terminal to track redemption of the digital promotion; and using machine learning to learn combinations of text and machine-readable images that increase interest in the promoted product by accepting, as input to a machine learning algorithm, the tracked redemption, the aisle-transaction counts, the store transaction count, and the text and at least one machine-readable image of the aisle violator sign, and updating, as output from the machine learning algorithm, the text and the at least one machine-readable image.

17. The non-transitory computer readable medium of claim 16 wherein the operations comprise identifying the at least one location for the aisle violator sign to correspond to the aisle location having a greater aisle-transaction count from among the aisle locations for a given shopper path of travel.

18. The non-transitory computer readable medium of claim 16 wherein the operations comprise determining the promoted product based upon the promoted product being in an aisle location having a lower aisle-transaction count from among the aisle locations for a given shopper path of travel.

19. The non-transitory computer readable medium of claim 16 wherein the operations comprise updating the at least one location for the aisle violator sign based upon the tracked redemption of the digital promotion for the promoted product at the POS terminal.

* * * * *